P. L. JENSEN.
WIRELESS APPARATUS.
APPLICATION FILED JUNE 4, 1912.
1,106,874.
Patented Aug. 11, 1914.
2 SHEETS—SHEET 1.
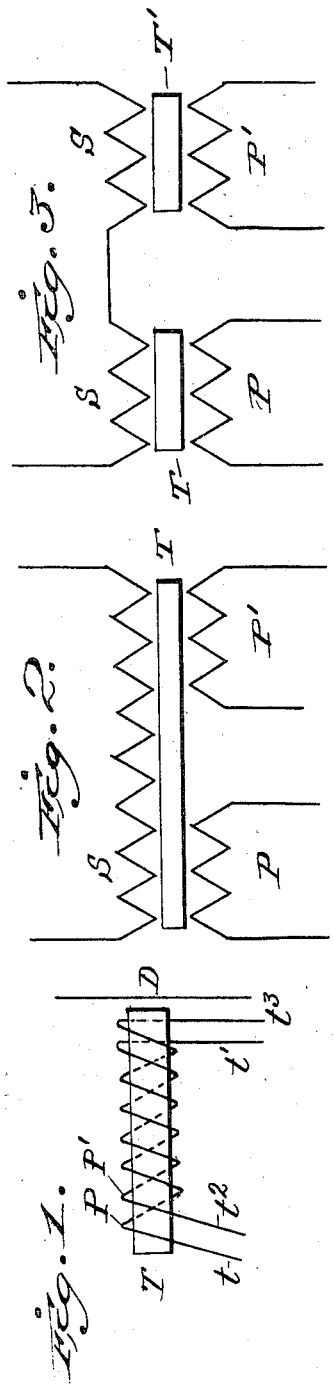
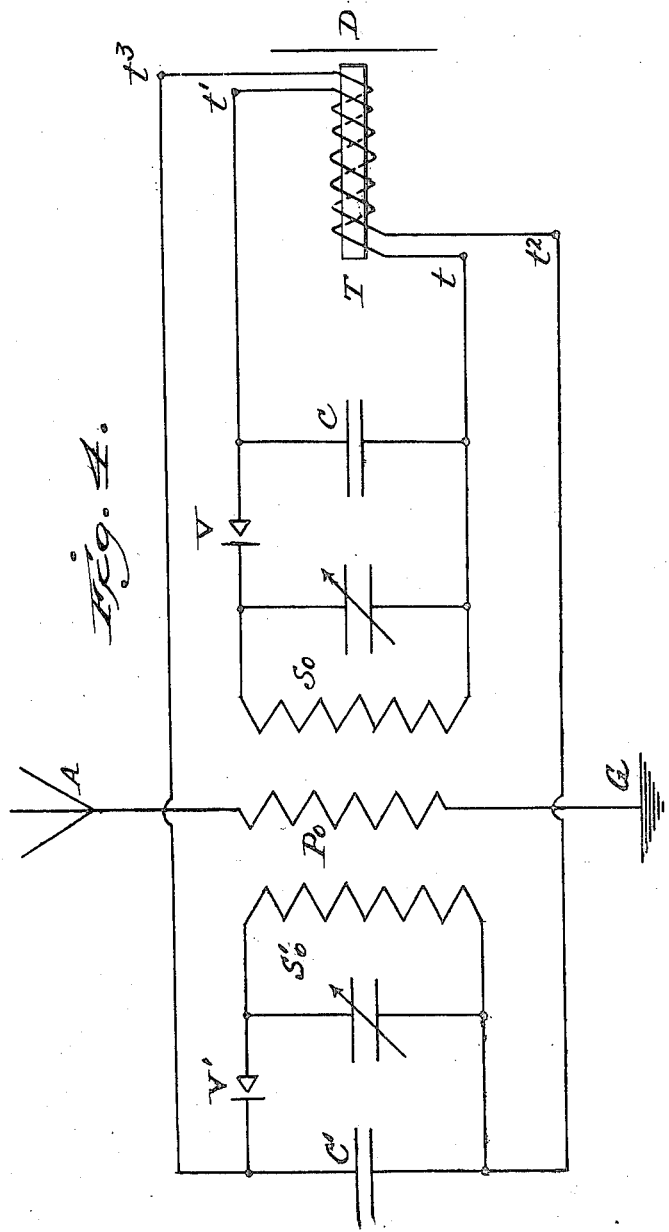

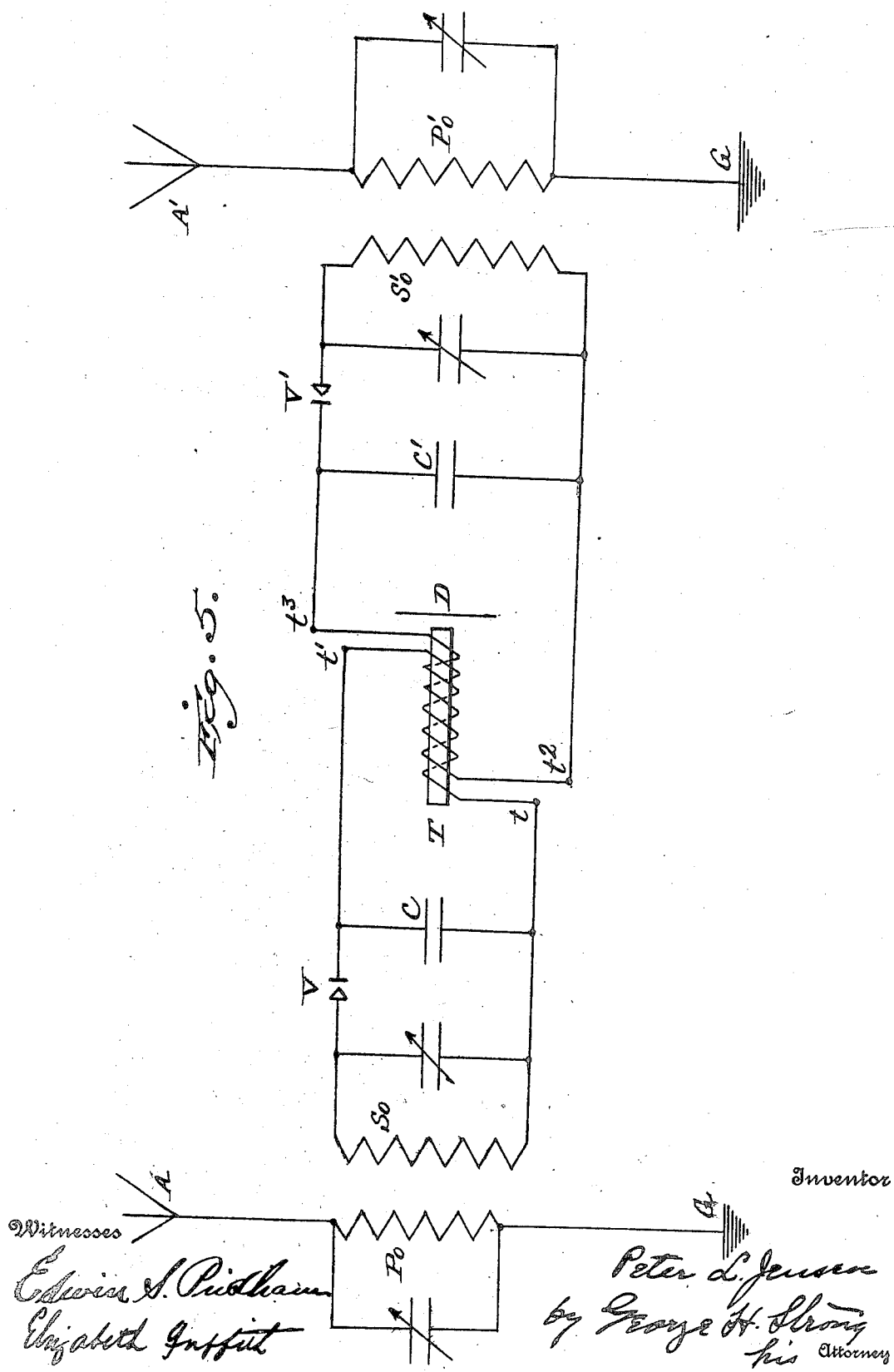

UNITED STATES PATENT OFFICE.

PETER L. JENSEN, OF SAN FRANCISCO, CALIFORNIA, ASSIGNOR TO COMMERCIAL WIRELESS AND DEVELOPMENT COMPANY, OF SAN FRANCISCO, CALIFORNIA, A CORPORATION OF ARIZONA.

WIRELESS APPARATUS.

1,106,874.  Specification of Letters Patent.  Patented Aug. 11, 1914.

Application filed June 4, 1912. Serial No. 701,652.

*To all whom it may concern:*

Be it known that I, PETER L. JENSEN, a subject of the King of Denmark, residing in the city and county of San Francisco and State of California, have invented new and useful Improvements in Wireless Apparatus, of which the following is a specification.

This invention relates to the receiving of electromagnet waves and the elimination of the disturbing effects of extraneous atmospheric electricity and waves emanating from interfering stations.

The object of the present invention is to provide a means by which telegraphic impulses may be received free from the effects of interfering electromagnetic waves. These interfering electromagnetic waves generally consist of discharges of atmospheric electricity and are commonly known as static. It is difficult to communicate by wireless telegraphy when static disturbances are present and it becomes nearly impossible when the static is strong, as is often the case when warm weather prevails. This fact has greatly handicapped the commercial development of wireless telegraphy, so that at the present time this method of communication is limited to places where wire telegraphy is either difficult or impossible. It is known that undamped or nearly undamped waves have great selectivity. A wireless receiving circuit tuned to receive an undamped or very slightly damped wave of definite length will not respond to waves of a different length, the exactness of tuning being about one per cent in practice; that is, in a system using undamped waves, waves differing in length by one per cent. may be used without interference. It is also known that static or atmospheric electricity which discharges through the antenna and receiving circuit at varying intervals, will be observed with nearly equal strength on any wave length. We take advantage of these facts and by an arrangement which I claim as my invention I have caused the static to appear with equal strength in two independent windings, while the telegraphic impulses appear in but one of the windings. In this manner I have been able to neutralize the effect of the static while the telegraphic impulses are free from disturbance.

The method by which this is accomplished is as follows: Two independent secondary oscillation circuits are coupled to a source or sources of primary oscillations. The primary oscillations may take place in one primary oscillation circuit in connection with the antenna and ground, or there may be two complete primary oscillation circuits, each having an independent antenna and ground connection. The two secondary oscillation circuits are entirely independent of each other, and are coupled inductively to the primary oscillation circuit or circuits. Means of independently varying the coupling constants to the primary oscillation circuit are used, and the ordinary method of varying the oscillation constants of the circuits is used. One of the secondary circuits is tuned to receive the telegraphic impulses consisting of the undamped or slightly damped oscillations, the other secondary circuit is arranged to be out of tune for these telegraphic impulses. That is, the coupling and the oscillation constants of the two secondary circuits are so arranged that the telegraphic impulses are present in but one of the secondary circuits. Under these conditions static discharges will affect this secondary circuit in the usual manner. The other secondary being tuned to some other wave length, will likewise be affected by the static discharges. If but one primary circuit be used the secondary in which the telegraphic impulses are to occur, is put into as close resonance with the primary as possible, and a loose coupling is used; while the other secondary being tuned to a differing wave length, must necessarily be to some degree out of resonance with the primary; however, since the static is not a closely tuned wave, this makes but little difference. The strength of the static discharge in this secondary may be varied by varying the coupling to the primary. When two complete primary oscillation circuits are used, then both secondaries may be put in resonance with their respective primary circuits and the strength of the oscillations in either circuit may be varied by the coupling.

The novel means of neutralizing the effects of the static and allowing the telegraphic impulses to come through undisturbed, I claim as my invention.

Figure 1 is a telephone receiver with two separate and independent windings. Fig. 2 is a magneto-inductive device with two independent energizing windings, and a secondary winding influenced by the resultant effect of the two independent energizing windings. Fig. 3 shows a view of the magneto-inductive device with the two independent energizing windings wound on separate cores, with part of the secondary on each core. Fig. 4 shows a wireless receiving circuit, consisting of an antenna, a primary oscillation circuit and ground connection, and two independent secondary oscillation circuits coupled inductively to the primary oscillation circuit, means for rectifying independently, oscillations in the two secondary oscillation circuits, and the connections to the magneto-inductive device. Fig. 5 shows two complete primary oscillation circuits connected to two independent antennæ, two independent secondary oscillation circuits coupled inductively to the primary oscillation circuits, means for rectifying independently, oscillations in the secondary oscillation circuits, and the connections to the magneto-inductive device.

Referring to Fig. 1, T is an iron core upon which are wound two independent windings P and P', with the terminals $t$—$t^1$ and $t^2$—$t^3$. D is a diaphragm affected by the magnetism of the iron core T; an ordinary telephone receiver wound with two independent windings gives perfect satisfaction. If a current $i$ goes through the winding P alone, the core T will be magnetized, the diaphragm D will be attracted and a sound will be heard. If now an equal current be sent through the winding P', but in the opposite direction, the magnetic effects of the two currents will neutralize each other, and the diaphragm D will remain unaffected. No effect will be produced if the magnetic effects are equal and opposite. However, if two equal and opposite magnetic effects are acting upon the iron core T, and a third inducing effect be present in one winding, the magnetic equilibrium will be unbalanced and the effect of this third inducing condition will be noticed.

Referring to Fig. 2, a magneto-inductive device is shown consisting of two independent windings P and P' wound upon an iron core T, and a secondary winding S influenced by the inductive effects of the two independent primary circuits P and P'. If the terminals of the secondary S be connected to an indicating device, such as a telephone receiver, and current be sent through one of the windings P, a click will be heard in the receiver, due to the inductive influence of the primary P on the secondary S. If, however, an equal and opposite current be sent at the same time through the winding P', no effect will be produced at the receiver. It is understood, of course, that if the currents are equal and opposite the windings P and P' must be identical. However, I wish to state that it is not an essential feature of the device that the windings P and P' be identical, as by regulation, the amount of current passing may be made to produce the desired result. Now, if while two equal and opposite inductive effects are acting on the core T, a third inducing effect is produced in one of the primaries, this third effect will alone be heard in the telephone receiver.

Referring to Fig. 3, a magneto-inductive device is shown, consisting of two separate and independent primary circuits P and P', wound respectively on the cores T and T' and a secondary, a portion of which is wound on each core. The portions of the secondary are connected in series. The principle of this arrangement is the same as that of Fig. 2, with the exception that better results are obtained by separating the two primary circuits P and P'. The reason for this being that the third inducing effect in one of the primaries has a detrimental effect on the other primary. By this arrangement the currents flowing in the primary circuits are free from mutual induction, and the full effect is produced in the secondary S. It is understood that other arrangements utilizing the same principle could be used. I claim the novelty of using such arrangements in connection with wireless receiving circuits for the elimination of undesired impulses.

Referring to Fig. 4, a wireless receiving circuit is shown, consisting of an antenna A, a primary oscillation circuit $P_0$, and two secondary oscillation circuits $S_0$ and $S'_0$. The usual method of varying the constants of the circuits is used. The secondary oscillation circuit $S_0$ is tuned to receive the telegraphic impulses; the secondary $S'_0$ is out of tune for the telegraphic impulses. The coupling is so arranged that the telegraphic impulses are present in the secondary $S_0$ only. However, the static disturbances appear in both circuits $S_0$ and $S'_0$. By varying the coupling constant of the secondary oscillation circuit $S'_0$, the static may be made to appear with equal strength in each secondary, while the telegraphic impulses appear only in the secondary circuit $S_0$. V and V' are two rectifiers connected respectively to the oscillation circuits $S_0$ and $S'_0$. C and C' are fixed condensers of about one-half microfarad each. The terminals $t$—$t^1$ and $t^2$—$t^3$ of the magneto-inductive device M are connected, respectively, to the terminals of the condensers C and C'. Other connections to the two independent rectified circuits may be employed, but a usual method is shown in the Fig. 4. The rectified currents from the rectifier V consist of the rectified current due to the static and the telegraphic impulses. The rectified currents from the rectifier V' consist of current due to the static alone. The rectified currents are passed respectively around the windings of the magneto-inductive device M, and in such direction that the inductive effect due to the static currents is zero, while the inductive effect due to the rectified telegraphic impulses is made apparent either by the diaphragm, as shown in Fig. 1, or by some indicating device connected to the terminals of the secondary S, as shown in Fig. 2.

Referring to Fig. 5, two complete and independent wireless receiving circuits are shown with two antennæ, A and A', and two primary oscillation circuits $P_0$ and $P_0'$, otherwise the arrangement is the same as shown in Fig. 4.

It is essential to the proper working of the device that currents arising from the telegraphic impulses be used to the greatest possible extent to operate the indicating device. If there be any shunt path around that portion of the circuit including the indicating device, the efficiency of the arrangement will necessarily be cut down.

Having thus described my invention and the manner in which the same is to be used, what I claim and desire to secure by Letters Patent, is—

1. In a wireless receiving circuit, a means of receiving desired signals free from the disturbing effects of extraneous electro-magnetic waves, comprising a magnetic-inductive device wound with two independent energizing windings in combination with two independent circuits of which said energizing windings respectively form parts, said circuits being so constituted as to permit currents generated in either to flow independently of currents in the other, means for causing currents due to extraneous electromagneto waves to appear in both of said circuits, means for causing the currents due to the desired signals to appear in but one of said circuits, means for independently varying the strength and direction of currents through said circuits, and means of detecting the resultant effect of said currents on said magneto-inductive device.

2. In a wireless receiving circuit for the reception of electro-magnetic waves, a means for eliminating the disturbing effect of atmospheric electricity on received signals, comprising two independent secondary oscillation circuits, means for rectifying independently oscillations in said oscillation circuits, two independent equally constituted circuits through which currents may simultaneously flow with equal facility, means for independently varying the strength and direction of currents in said equally constituted circuits, in combination with a magneto-inductive device having two independent energizing windings, said energizing windings respectively forming parts of and included in said equally constituted circuits, said magneto inductive device being provided with means for detecting the resultant effect of currents flowing through said energizing windings.

3. In a receiving circuit for the reception of electro-magnetic waves, a means for eliminating the disturbing effect of atmospheric electricity on desired signals, comprising two independent oscillation circuits, means for causing desired signals to appear in but one of said oscillation circuits, means for causing disturbing waves to appear in both of said oscillation circuits, means for rectifying independently the received waves in said oscillation circuits, means for controlling the strength and direction of said rectified waves, in combination with a magneto-inductive device having two independent energizing windings, said independent energizing windings respectively forming parts of and included in two identical circuits through which said rectified waves may respectively flow and said magneto-inductive device being provided with means for detecting the resultant effect of said rectified impulses in said energizing windings.

4. In a receiving circuit for the reception of electro-magnetic waves, a means for eliminating the effect of atmospheric electricity or interfering electric disturbances on desired signals, comprising two oscillation circuits, two rectifiers respectively included in two independent circuits, said circuits being respectively connected to said oscillation circuits and said independent circuits so constituted that current flowing in one of said circuits is independent of current flowing in the other of said circuits, means for controlling the strength and direction of currents in said circuits, in combination with a telephone receiver wound with two independent energizing windings, said energizing windings included in and forming parts respectively of said independent circuits.

In testimony whereof I have hereunto set my hand in the presence of two subscribing witnesses.

PETER L. JENSEN.

Witnesses:
JOHN H. HERRING,
WALTER REIMERS.